(12) United States Patent
Kershaw et al.

(10) Patent No.: US 11,378,414 B2
(45) Date of Patent: Jul. 5, 2022

(54) TREND INDICATIONS FOR AVIONICS SYSTEMS

(71) Applicant: Gulfstream Aerospace Corporation, Savannah, GA (US)

(72) Inventors: Nicholas Kershaw, Savannah, GA (US); Kristin Medin, Savannah, GA (US); Christopher Watkins, Savannah, GA (US); Jeffrey Hausmann, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 303 days.

(21) Appl. No.: 16/286,859

(22) Filed: Feb. 27, 2019

(65) Prior Publication Data

US 2019/0265066 A1   Aug. 29, 2019

Related U.S. Application Data

(60) Provisional application No. 62/635,975, filed on Feb. 27, 2018.

(51) Int. Cl.
*G01C 23/00* (2006.01)
*B64D 43/00* (2006.01)
(Continued)

(52) U.S. Cl.
CPC ............ *G01C 23/005* (2013.01); *B60K 35/00* (2013.01); *B60K 37/06* (2013.01); *B64D 43/00* (2013.01);
(Continued)

(58) Field of Classification Search
CPC .......... G08G 5/00; G08G 5/04; G08G 5/0021; G08G 5/0086; G08G 5/0095;
(Continued)

(56) References Cited

U.S. PATENT DOCUMENTS 3,839,699 A * 10/1974 Heinsohn ............. G08G 5/0052
340/966
3,958,219 A * 5/1976 Bateman .............. G08G 5/0021
340/970

(Continued)

FOREIGN PATENT DOCUMENTS

WO         0235303 A2    5/2002

*Primary Examiner* — Russell Frejd
*Assistant Examiner* — Brandon Z Willis
(74) *Attorney, Agent, or Firm* — LKGlobal | Lorenz & Kopf, LLP (57) ABSTRACT

An aircraft includes a display, a support system, and an avionics system. The support system includes at least one operable component, where at least one of the support system and the at least one operable component is configured to operate with an operating value falling within a predefined normal operating range. The avionics system is programmed to: calculate a rate of change of a value of at least one of the support system and the at least one operable component; determine whether the value will exit a predetermined normal operating range within a predetermined time based on the rate of change of the value; and indicate on the display that the value is expected to exit the predetermined normal operating range. The avionics system can leverage this function to declutter displays, and then present additional information to the crew when a value is trending out of range.

20 Claims, 9 Drawing Sheets

(51) Int. Cl.
    *B64D 45/00*     (2006.01)
    *G06F 3/04847*     (2022.01)
    *B60K 37/06*     (2006.01)
    *B60K 35/00*     (2006.01)
    *G06F 3/0484*     (2022.01)
    *B60K 37/00*     (2006.01)

(52) U.S. Cl.
    CPC ........... *B64D 45/00* (2013.01); *G06F 3/0484* (2013.01); *G06F 3/04847* (2013.01); *B60K 37/00* (2013.01); *B60K 2370/1523* (2019.05); *B60K 2370/178* (2019.05)

(58) Field of Classification Search
    CPC .. G01C 23/005; G01C 23/00; G01C 21/3697; G01C 9/005; G06F 11/327; G06F 11/079; G06F 2201/86; B64C 2201/01; B64D 43/02; B64D 43/00; B64D 2045/0085; H04L 2209/84
    See application file for complete search history.

(56) References Cited

U.S. PATENT DOCUMENTS

| | | | |
|---|---|---|---|
| 5,881,971 A * | 3/1999 | Hickman | G05D 1/0055 244/1 R |
| 6,691,004 B2 * | 2/2004 | Johnson | G01C 5/005 340/945 |
| 6,753,891 B1 | 6/2004 | Chohan et al. | |
| 10,556,703 B1 * | 2/2020 | Skola | G08G 5/0021 |
| 2006/0220914 A1 * | 10/2006 | Sikora | G01D 7/08 340/945 |
| 2012/0209468 A1 | 8/2012 | Thomas | |
| 2013/0197739 A1 | 8/2013 | Gallagher et al. | |
| 2014/0316613 A1 * | 10/2014 | Jang | G05B 23/0286 701/3 |
| 2015/0066253 A1 * | 3/2015 | Hayes | B64D 45/00 701/3 |
| 2015/0348420 A1 * | 12/2015 | Kneuper | G06F 3/0481 345/629 |
| 2017/0088284 A1 * | 3/2017 | Holder | B64D 43/00 |
| 2017/0210484 A1 | 7/2017 | Figard et al. | |
| 2017/0345318 A1 * | 11/2017 | Kim | G08G 5/0052 |

\* cited by examiner

TREND INDICATIONS FOR AVIONICS SYSTEMS

CROSS-REFERENCE TO RELATED APPLICATIONS

This application claims the benefit of U.S. Provisional Application No. 62/635,975 filed on Feb. 27, 2018. The disclosure of the above application is incorporated herein by reference.

TECHNICAL FIELD

The technical field relates generally to avionics systems and methods for presenting aircraft information, and more particularly relates to avionics systems and methods for presenting trend indications for aircraft data.

BACKGROUND

Conventional avionics systems of aircraft display operational values for various components and systems. For example, a single synoptic diagram might display all current temperatures and pressures for each measured temperature and pressure in various systems of the aircraft. Crew Alerting System (CAS) messages typically alert the crew when one of these values exits a predetermined operating range. For example, when a hydraulic pressure drops below a lower pressure value required for effective operation of a hydraulic system, the avionics system may alert the crew using a CAS message. The presentation of all operational values during normal conditions can clutter the displays and make it difficult for the crew to monitor and recognize non-normal conditions.

SUMMARY OF EMBODIMENTS

Various non-limiting embodiments of avionics systems, controllers, and methods of presenting aircraft information are disclosed herein.

In a first non-limiting embodiment, an aircraft includes, but is not limited to, a display, a support system, and an avionics system. The support system includes at least one operable component, where at least one of the support system and the at least one operable component is configured to operate with an operating value falling within a predefined normal operating range. The avionics system is communicatively coupled with the display. The avionics system is programmed to: calculate a rate of change of a value of at least one of the support system and the at least one operable component; determine whether the value will exit a predetermined normal operating range within a predetermined time based on the rate of change of the value; and indicate on the display that the value is expected to exit the predetermined normal operating range.

In a second non-limiting embodiment, an avionics system for an aircraft includes, but is not limited to, a display and a controller. The controller is programmed to: calculate at least one of a rate of change of a value of a component of the aircraft and variance from equilibrium; determine whether the value will exit a predetermined normal operating range within a predetermined time based on at least one of the rate of change of the value and the variance from equilibrium; indicate on the display that the value is expected to exit the predetermined normal operating range; and indicate the rate of change of the value on the display.

In a third non-limiting embodiment, an aircraft includes, but is not limited to, an operable component and an avionics system. The operable component is configured to operate with an operating value falling within a predefined normal operating range. The avionics system is programmed to: calculate a rate of change of a value of the operable component; determine whether the value will exit a predetermined normal operating range within a predetermined time based on the rate of change of the value; and generate a graphic and an indicator to indicate on a display that the value is expected to exit the predetermined normal operating range.

BRIEF DESCRIPTION OF THE DRAWINGS

Advantages of the present embodiments will be readily appreciated as the embodiments becomes better understood by reference to the following detailed description, when considered in connection with the accompanying drawings wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

In general, the embodiments described herein relate to decluttering and organizing aircraft information presented to crew members of an aircraft. Some decluttering is accomplished by presenting different layers of information only when the specific layer is relevant or requested. In one example, a system status page only displays limited information identifying the various systems when the systems are operating within a normal operating range. When the systems are trending out of the normal operating range or are already out of the operating range, additional layers and indications may be presented on the system status page.

Figure 1:
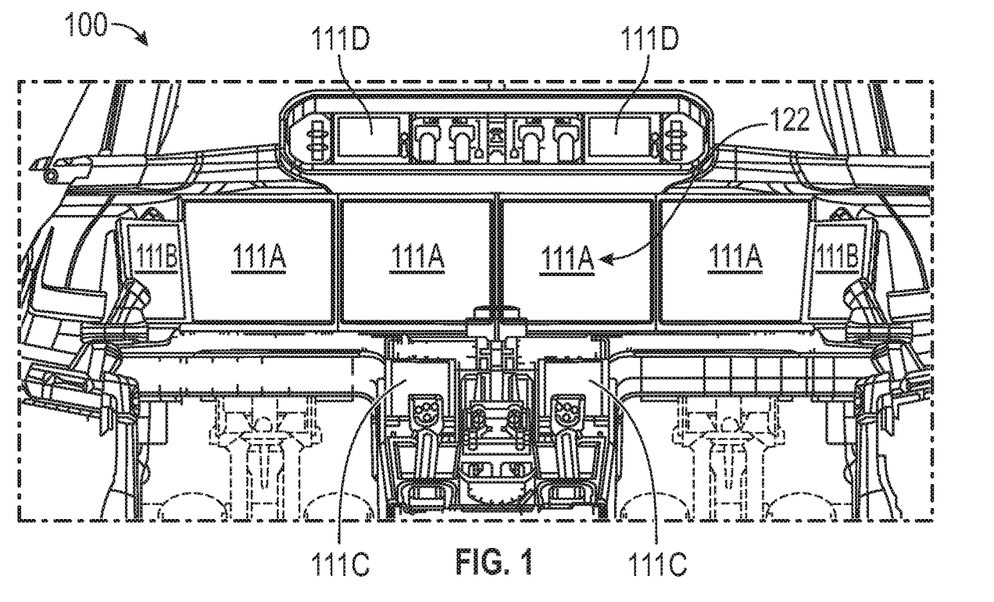
FIG. 1 is a front view illustrating a non-limiting embodiment of a flight deck of an aircraft in accordance with the teachings of the present disclosure.
Figure 2:
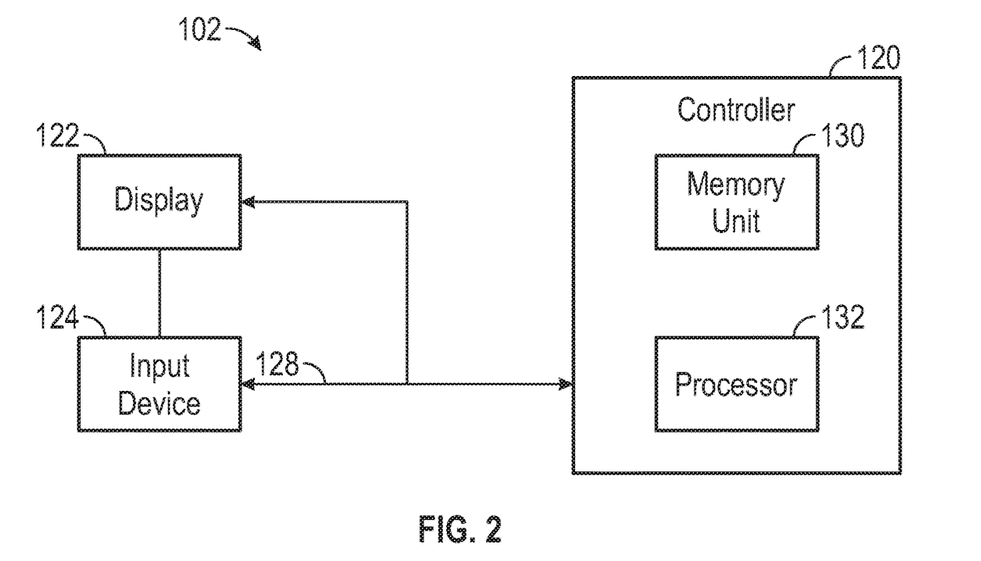
FIG. 2 is a block diagram illustrating a non-limiting embodiment of an avionics system of the aircraft of FIG. 1 in accordance with the teachings of the present disclosure.

FIG. 1 is front view illustrating a flight deck of an aircraft 100 and FIG. 2 is a block diagram illustrating an avionics system 102 in accordance with teachings of the present disclosure. Although the context of the discussion contained herein is with respect to a business jet, it should be understood that the teachings of the present disclosure are compatible with all types of aircraft including, but not limited to, private jets, commercial jet passenger aircraft, cargo aircraft, military aircraft, rotorcraft, and the like. Furthermore, although the avionics system disclosed herein is described as being on an aircraft, it should be understood that the present avionics system is compatible with all types of vehicles. For example, and without limitation, the avionics system disclosed herein may be implemented on board automobiles, buses, trains, ships, spacecraft, and any other type of conveyance. Additionally, the avionics system disclosed herein is not limited to implementation on vehicles, but may also be utilized in tents, houses, buildings, stadiums, theaters, and other permanent and/or semi-permanent structures.

Avionics system 102 includes a controller 120, a display 122, an input device 124, and an interconnect 128. Interconnect 128 communicatively couples controller 120, display 122, and input device 124 for electronic communication. In the example provided, interconnect 128 is a communication or network bus, as will be appreciated by those with ordinary skill in the art. It should be appreciated that any suitable network topology or physical medium may be utilized for electronic communication in avionics system 102. In some embodiments, interconnect 128 is a wireless communications network.

Controller 120 is a hardware device that carries out instructions of a computer program, as is well known to those of ordinary skill in the art. Controller 120 is configured to execute the computer program to provide the functions described in the methods below. In some embodiments, controller 120 may be configured to provide other functions, such as the functions of a conventional flight management system (FMS) in addition to performing the tasks of the methods described herein. Controller 120 includes one or more memory units 130 that store electronic data and computer programs. For example, memory units 130 may be flash memory, spin-transfer torque random access memory (STT-RAM), magnetic memory, phase-change memory (PCM), dynamic random access memory (DRAM), or other suitable electronic storage media. In the example provided, memory units 130 store control logic with instructions that cooperate with a processor 132 of controller 120 to perform tasks of the method described below. In some embodiments, processor 132 may include one or more central processing units ("CPUs"), a microprocessor, an application specific integrated circuit ("ASIC"), a microcontroller, and/or other suitable device.

Furthermore, controller 120 may utilize multiple hardware computation devices that communicate to form the controller. In some embodiments, not all controls will be present on a common hardware device and display system. For example, an electronic checklist on an MFD touch-enabled display will call for a virtual breaker to be pulled on the TSC, which is located on a TSC display system. A request would be issued over the communication network. In another example, an electronic checklist (ECL) calls for a physical breaker to be pulled, and may show a picture of the breaker location. The ECL step would be completed once it sensed the breaker had been pulled. In another example, a primary hardware device performs some functions of controller 120 and a separate secondary hardware device generates images and commands display 122 to present the images.

Input device 124 receives user inputs from pilots and crew of the airplane. In the example provided, input device 124 is integrated with display 122 in a touchscreen device. Display 122 may be a single unit or may include multiple units. Each unit of display 122 is an electronic display that is electronically coupled with controller 120 to visually present information and data in an image according to electronic signals generated by controller 120. For example, display 122 may include cathode ray tubes ("CRT"), light-emitting diodes ("LED"), plasma panels, liquid crystal displays ("LCD"), projected images from a Digital Light Processing ("DLP") projector, and/or any other suitable electronic display technology.

In the example provided, display 122 includes screen units 111A, screen units 111B, screen units 111C, and screen units 111D. Screen units 111A are located in front of crew seats to act as Primary Flight Displays (PFDs) and Multi-Functional Displays (MFDs). Screen units 111B are tablet sized screens located to the left and right of screen units 111A. Screen units 111C are tablet sized screens located on a center console between crew members. Screen units 111D are located in an instrument panel in front of pilots, and are typically used for controlling a Flight Guidance Panel (FGP) or other aircraft systems. It should be appreciated that the methods and images below may be presented on any of screen units 111A-D without departing from the scope of the present disclosure. Display 122 may include other screens or visual presentation units without departing from the scope of the present disclosure. For example, display 122 may include Head-Up Displays (HUDs) or other screens having different configurations.

In some embodiments, input device 124 and display 122 are separate, such as when display 122 is a non-touch enabled screen and input device 124 is a cursor control device. Input device 124 may include trackballs, control sticks, or other suitable cursor control devices for the pilot or crew to communicate with controller 120. In some embodiments, input devices 124 may include microphones for voice recognition, or may be integrated with gesture sensors. It should be appreciated that other input devices 124 may be utilized without departing from the scope of the present disclosure.

Figure 3:
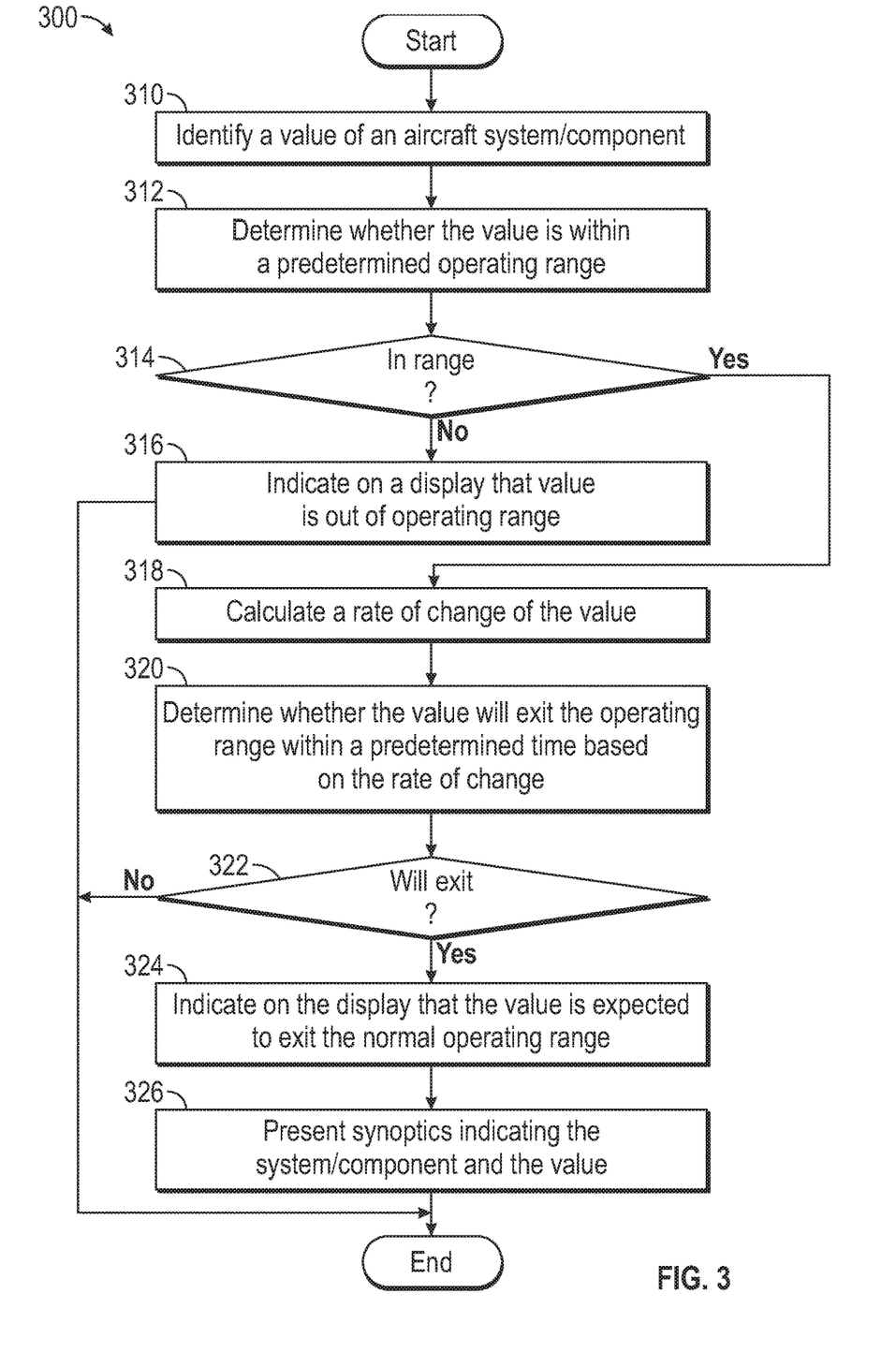
FIG. 3 is a flow diagram illustrating a non-limiting embodiment of a method of presenting aircraft information in accordance with the teachings of the present disclosure.
Figure 4A:
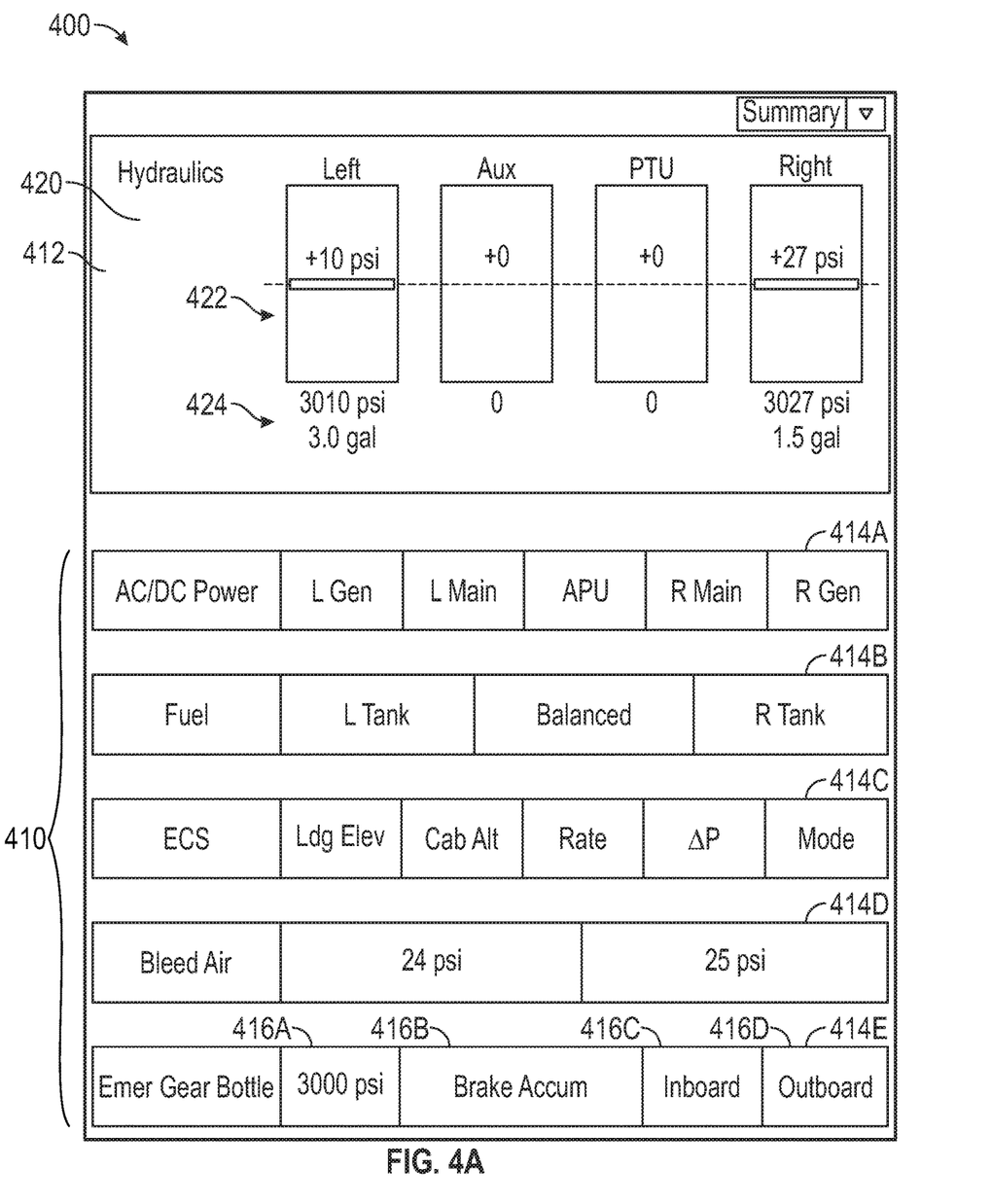
FIGS. 4A, 4B, 4C, 5, 6, and 8 are a graphical user interfaces in accordance with the teachings of the present disclosure.
Figure 4B:
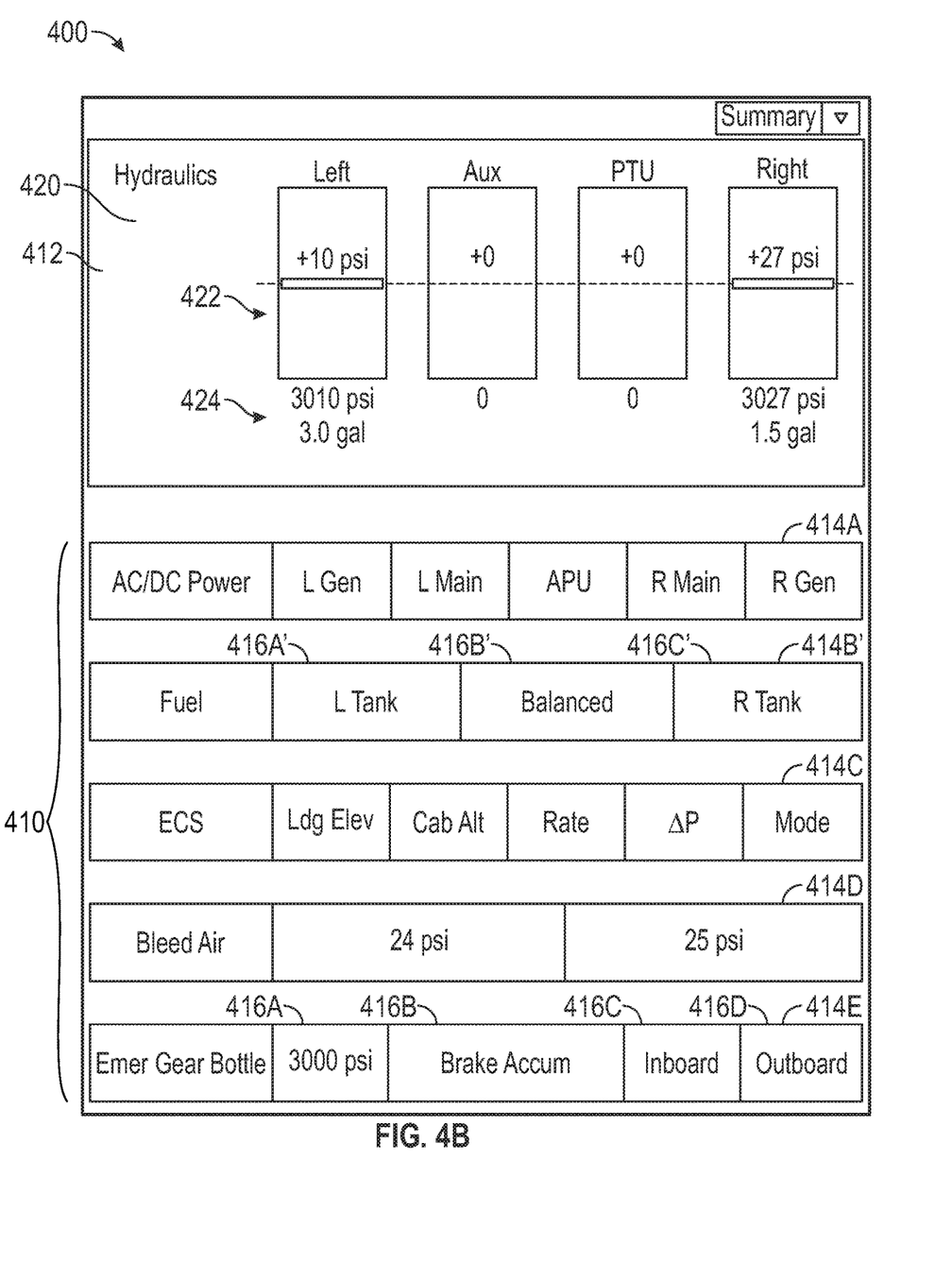
Figure 4C:
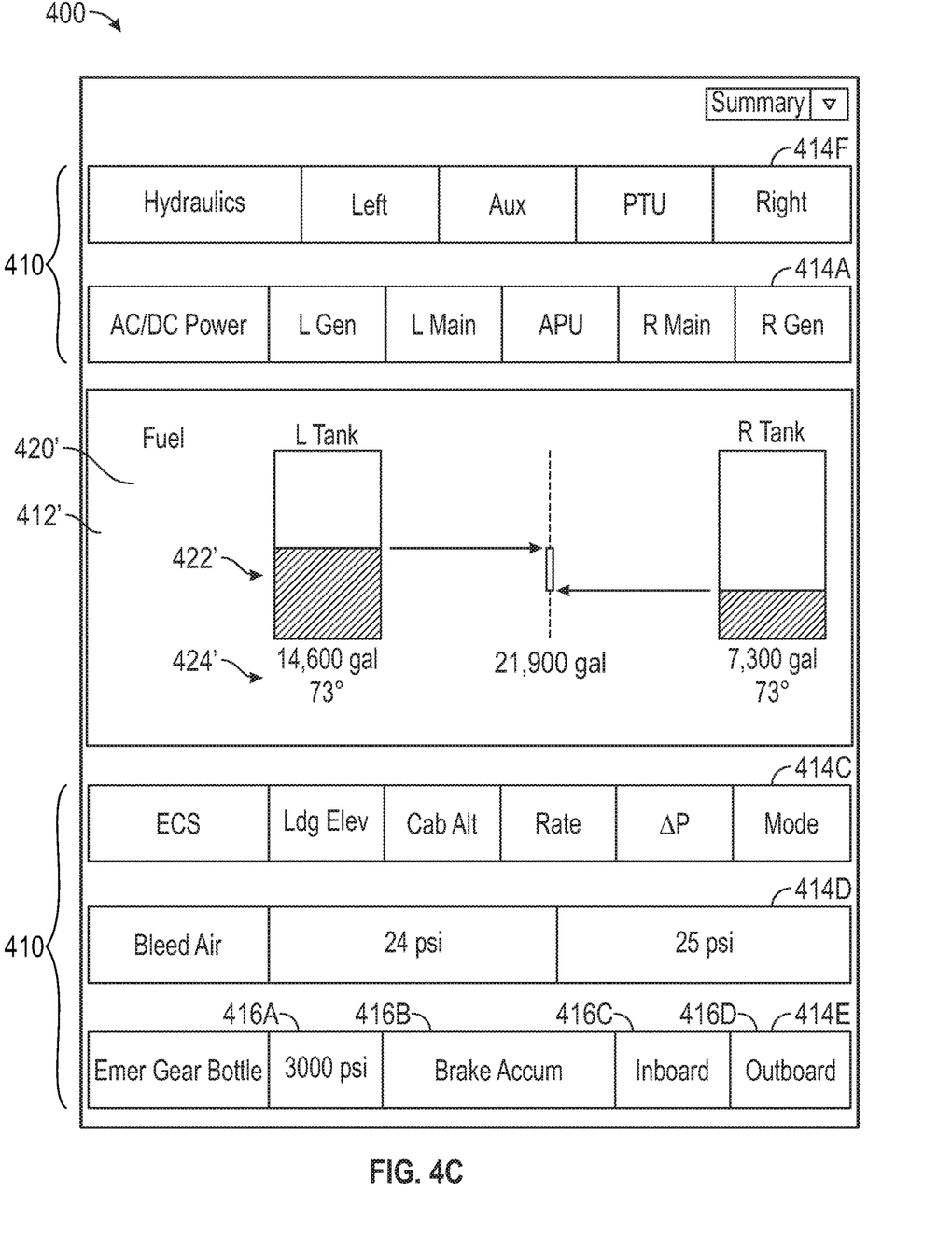

FIG. 3 is a flow diagram illustrating a non-limiting embodiment of a method 300 of presenting aircraft information in image 400 of FIGS. 4A-C in accordance with some embodiments. In the example provided, controller 120 performs the tasks of method 300 and generates image 400.

Image 400 of FIG. 4A includes a collapsed row portion 410 and an expanded row 412. The system indicated in the expanded row 412 and the systems that are indicated in collapsed row portion 410 may vary based on selections by a user or based on conditions of the systems indicated. In general, the collapsed row portion 410 permits a decluttered overall view of the various systems, while expanded row 412 permits viewing further details of system components and interaction with the system components.

Collapsed row portion 410 includes first through fifth collapsed rows 414A-E that each display characteristics or a status of an aircraft system in column cells of a single short row. In the example provided, the aircraft system characteristics and/or status are indicated by color based on whether components or conditions of the system are in a normal range, are trending out of range, or are out of normal range, as will be described below. In the example provided, the normal range is indicated by green text, the trending values are indicated by amber text, and out of normal range values are indicated by red text. In the example provided, the rows would be automatically collapsed when all values in the row were in normal range, and not trending out of range, and not in the edge boundary of normal range. Otherwise the rows would be automatically expanded to present additional information for the crew to monitor. The crew can also manually expand and collapse the rows. The edge boundary may be, for example, a second range that is narrower than the normal range. The second range is selected to inform the crew that a non-trending value may quickly exit the normal range if it begins to trend towards the normal range boundary since there is very little margin remaining within normal range.

In the example provided, collapsed row 414A presents AC/DC Power characteristics of the Left Generator, Left Main, Auxiliary Power Unit (APU), Right Main, and Right Generator in the column cells. Fuel collapsed row 414B presents Fuel characteristics of the Left Tank, of the tank balance, and of the Right Tank in the column boxes. The remaining collapsed rows indicate similar states of systems for their respectively labeled rows, as will be appreciated by those with ordinary skill in the art.

In the example provided, collapsed row 414E includes column cells 416A-D, and other collapsed rows include similar column cells. For example, collapsed row 414D includes column cells 416A-B and collapsed row 414C includes column cells 416A-D plus an additional column box (not numbered). The number of column cells may vary by row.

Expanded row 412 presents additional information about the system indicated in expanded row 412 in a graphic representation 420. Graphic representation 420 illustrates system components 422 of the system and component values 424 of the system. For example, the left hydraulic component 422 is illustrated along with pressure and volume component values 424.

Referring again to FIG. 3, and with continued reference to FIGS. 4A-C, task 310 identifies a value of an aircraft system or aircraft component. As used herein, to identify a value means to measure, retrieve, derive, or otherwise determine a numerical value of the system. For example, controller 120 at task 310 may identify component values 424 as a pressure of system components 422 in a hydraulics system.

Task 312 determines whether the value is within a predetermined operating range. For example, controller 120 may determine whether component values 424 are within a predetermined standard or normal operating range in which components 422 are designed to operate. In the example provided, the predetermined operating range is retrieved from a database and is defined by values determined by the aircraft manufacturer, operator, or maintenance crew. When the value is not within the predetermined operating range, task 314 routes method 300 to task 316. When the value is within the predetermined operating range, task 314 routes method 300 to task 318.

In some embodiments, task 312 and task 314 relate to a second operating range. The second operating range is selected to be narrower than the normal operating range such that the flight crew may be alerted when the value is near the boundary of the normal operating range. When the value is outside of the second operating range, task 316 indicates that the value is near a boundary of the normal operating range. For example, task 316 may change an appearance of the value, may generate a graphical representation of the system, may declutter screens to show labels and other normally hidden information, or may indicate the departure of the value from the second operating range in with other visual indicators to alert the crew that the value is at risk of departing the normal operating range.

Task 316 indicates on a display that the value is out of the predetermined operating range. For example, controller 120 may present text and graphics of the system red in the respective row 414A-E or 412 when the value is above an upper threshold or below a lower threshold of the predetermined operating range. In some embodiments, the system for which the value is outside of the predetermined operating range is selected by controller 120 as the expanded row 412.

For example, if a pressure in the bleed air system exceeds an upper threshold, controller 120 may select row 414D as a new expanded row 412 and may present a graphical representation of the bleed air system in the new expanded row 412. In some embodiments, multiple rows are expanded rows.

Task 318 calculates a rate of change of the value. For example, controller 120 may calculate a rate of change of fuel weight in a left fuel tank, a rate of change of fuel weight in a right fuel tank, and a rate of change of a weight difference between the left fuel tank and the right fuel tank for the fuel system of row 414B.

Task 320 determines whether the value will exit the operating range within a predetermined time based on the rate of change. For example, controller 120 may determine whether the weight difference between the left fuel tank and the right fuel tanks will exceed a normal operating difference range within ten minutes using the calculated rate of change of the weight difference. It should be appreciated that any monitored values and any amount of time may be utilized without departing from the scope of the present disclosure. Task 322 ends method 300 when the value will not exit the predetermined operating range within the predetermined time. Task 322 advances method 300 to task 324 when the value will exit the predetermined operating range within the predetermined time.

In some embodiments, variance from equilibrium may be used instead of or in addition to the rate of change to determine whether the value is trending out of range. For example, when a stabilizer angle doesn't match an elevator angle; a rudder is trimmed to the right of center.

Task 324 indicates on the display that the value is expected to exit the predetermined normal operating range. For example, controller 120 may generate image 400 of FIG. 4B. Image 400 of FIG. 4B is similar to image 400 of FIG. 4A, where like numbers refer to like features. Image 400 of FIG. 4B, however, includes collapsed row 414B' instead of collapsed row 414B. Collapsed row 414B' is amber colored and includes amber colored column cells 416A', 416B', and 416C'. In the example provided, the amber color is the indication that the fuel balance between the left fuel tank and the right fuel tank will exceed a predetermined normal difference range within a predetermined time. In some embodiments, controller 120 may indicate that the value is trending out of range by changing visual characteristics such as a color, a line location, a line weight, a shape, a fill type, and/or a fill color to indicate the value is expected to exit the range by changing the appearance of the value. Changing the appearance of the value may include changing the displayed numeral, the surrounding visual features, or combinations thereof.

In some embodiments, task 324 indicates on the display that the value is near the boundary of the normal operating range. For example, when the fuel balance difference is near the maximum difference that is still in range, then controller 120 may generate image 400 even if the fuel balance difference is not changing. By indicating the value is near the boundary, task 324 indicates the pilot should monitor a value that is near the edge of normal range, but is not changing, and therefore not trending to out-of-range.

Task 326 presents graphical representations or synoptics indicating the system, the component, and the value that will exit the predetermined normal operating range. For example, controller 120 may generate image 400 of FIG. 4C. Image 400 of FIG. 4C is similar to image 400 of FIG. 4B, where like numbers refer to like components. Image 400 of FIG. 4C, however, includes expanded row 412'. Expanded row 412' includes amber graphical representation 420', amber component representations 422', and amber component values 424' for the fuel system. In the example provided, controller 120 makes the hydraulics system a collapsed row 414F and selects the fuel system row as the new expanded row 412' in response to the determining that the fuel system value will exit the predetermined normal operating range within the predetermined time. In some embodiments, controller 120 may select the fuel system row as the new expanded row 412' in response to selection of the row by a user of the avionics system.

Figure 5:
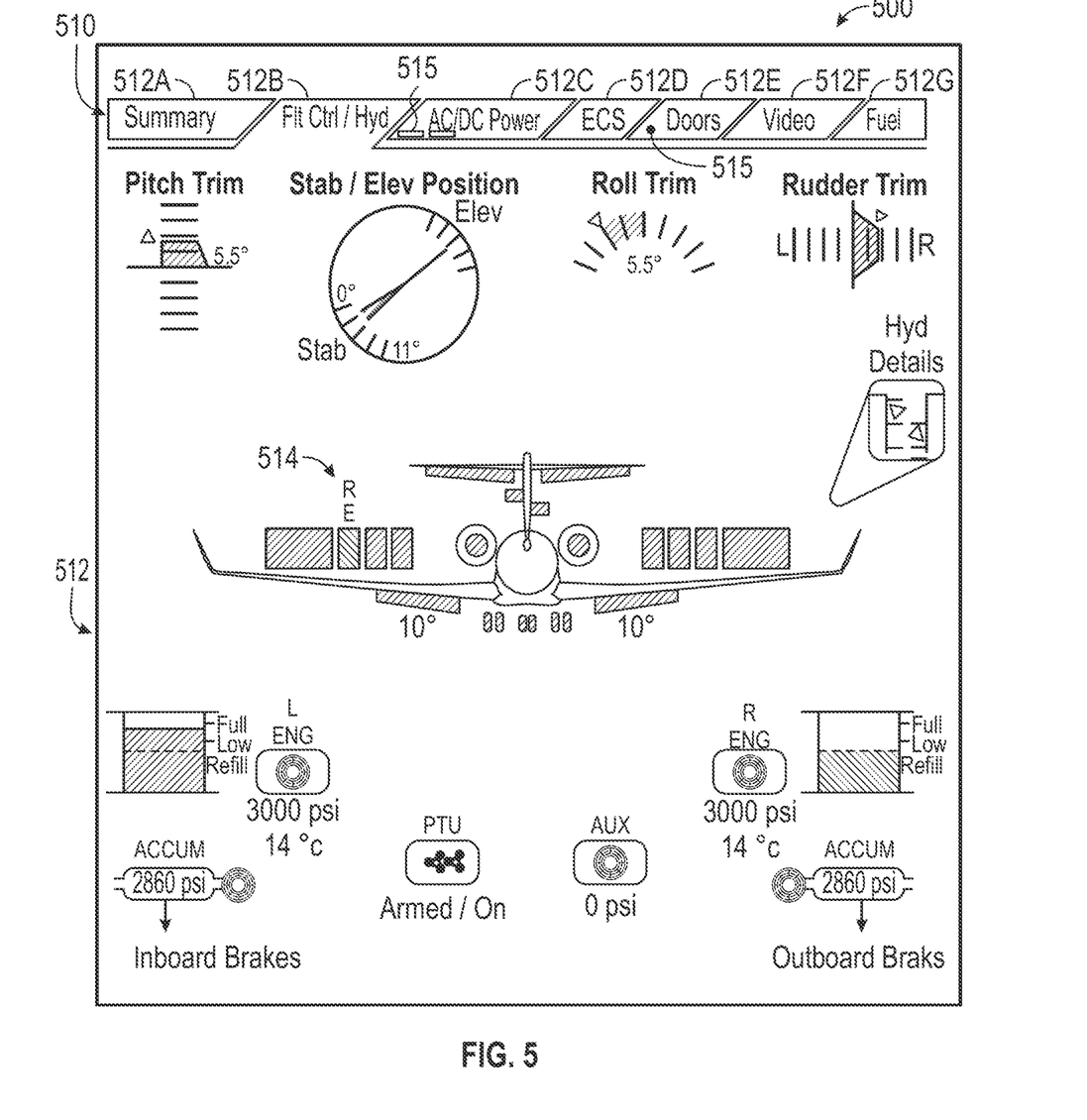

Referring now to FIG. 5, and with continued reference to FIGS. 2-3, an image 500 including indicators generated using method 300 is illustrated. In the example provided, controller 120 generates image 500. Image 500 includes a system tab row 510 and an information portion 512. System tab row 510 includes system tabs 512A-G that are each selectable to change the information presented in information portion 512.

In the example provided, the "Flight Control/Hydraulics" system is selected to present information about the status of flight control systems and hydraulics within the aircraft. The nominal state (e.g., nothing trending out of range) may have desaturated labels or labels that are hidden. A desaturated label is a label that is not brightly displayed. The saturated state showing all labels may be used when the pilot is specifically interacting with the "Flight Control/Hydraulics" page looking for information. For example, controller 120 may saturate all labels in response to a user gesture, voice command, hand proximity, etc. A hydraulic pressure that is trending to issue is shown with a saturated amber label, such as "RE" label 514 to draw attention to values for the right engine. In the example provided, the other engine and component labels are desaturated.

Each system tab 512A-G may also present an out-of-nominal trend indicator. For example, indicators 515 on tabs 512C and 512E indicate that components of the AC/DC Power system and of the door system are trending out of range, or within edge boundary of normal range, or outside of equilibrium, according to the method of FIG. 3.

Figure 6:
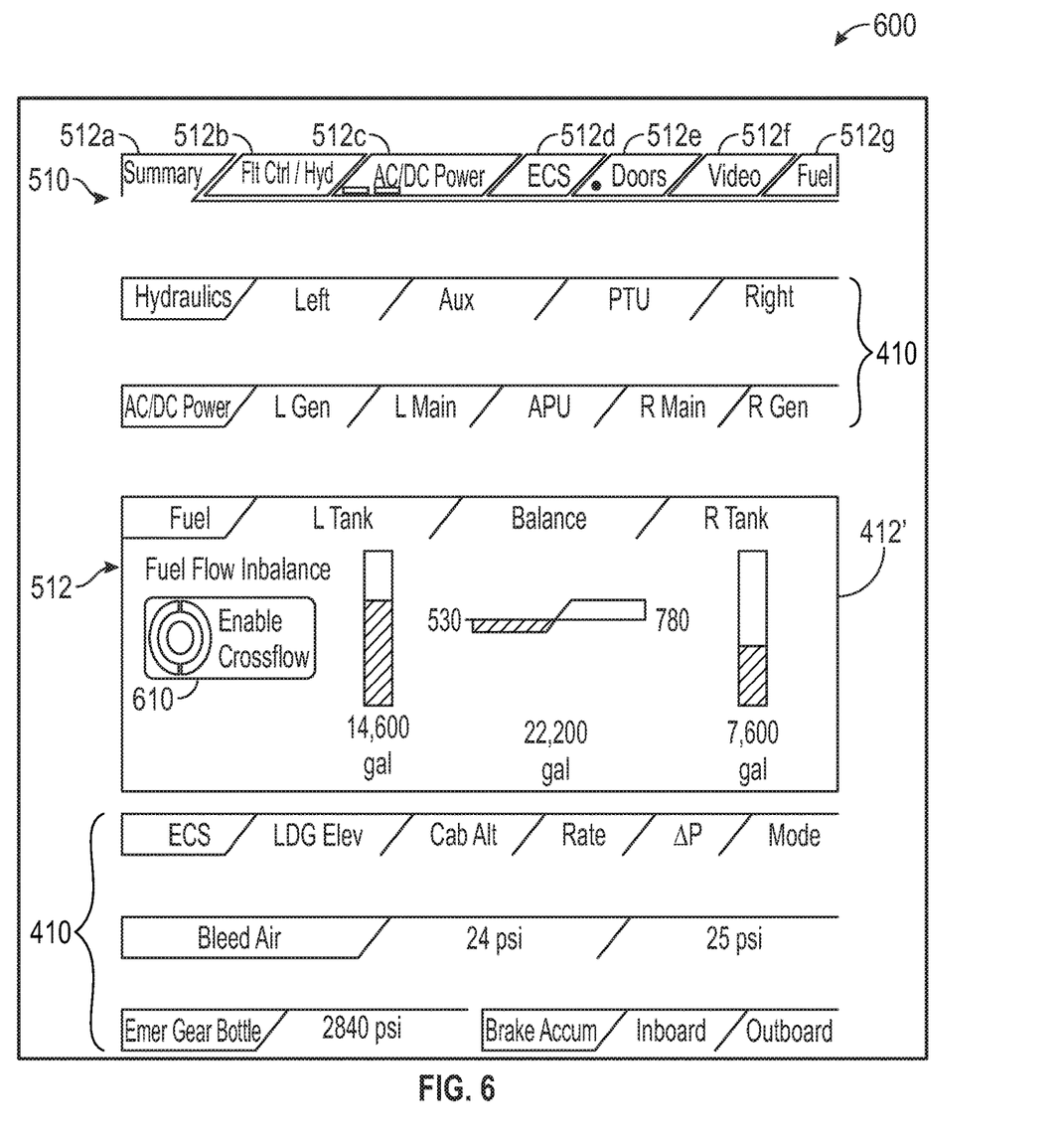

Referring now to FIG. 6, and with continued reference to FIGS. 2-3, 4C, and 5, an image 600 including indicators generated using method 300 is illustrated. Image 600 is similar to image 500, where like numbers refer to like components. Image 600, however, illustrates a selected summary tab 512A in system tab row 510.

Information portion 512 of image 600 is similar to image 400 of FIG. 4C, where like numbers refer to like components. Image 600, however, includes a quick access selector 610 to enable a crossflow valve that balances the fuel tanks to counteract the trending out of predetermined range fuel levels in the left and right fuel tanks.

Figure 7:
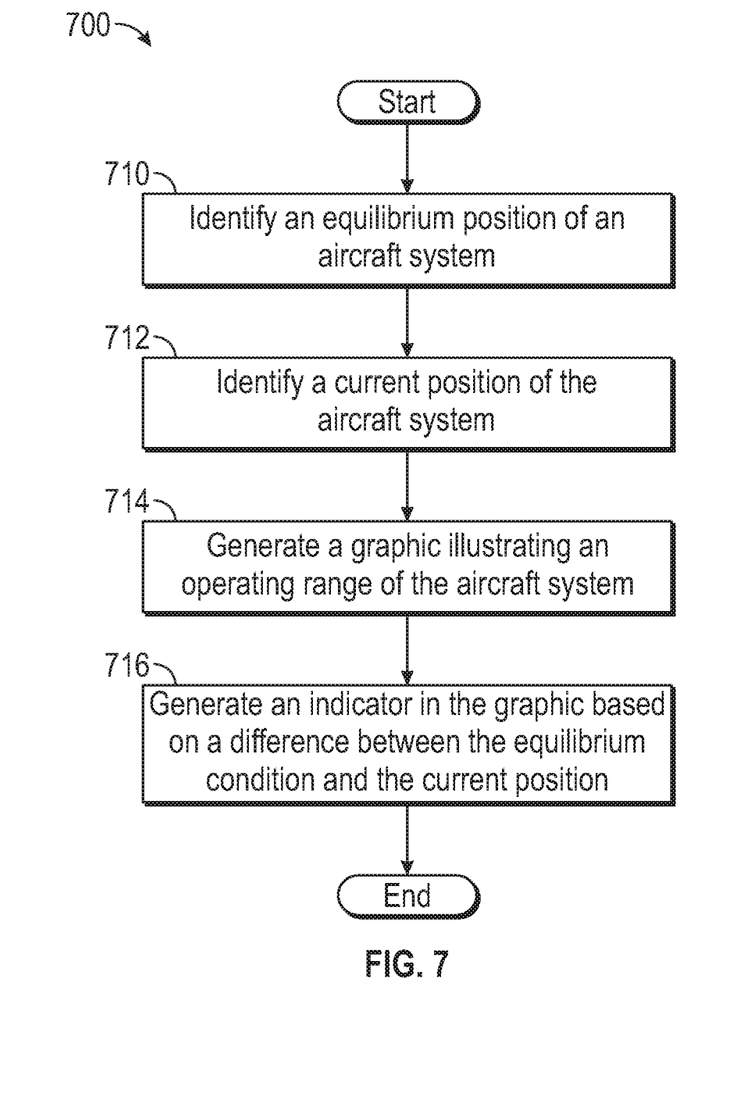
FIG. 7 is a flow diagram illustrating a non-limiting embodiment of a method of presenting aircraft information in accordance with the teachings of the present disclosure.

Referring now to FIG. 7, and with continued reference to FIGS. 1-2, a method 700 of presenting aircraft system information is illustrated in accordance with the principles of the present disclosure. In the example provided, controller 120 performs the tasks of method 700.

Task 710 identifies an equilibrium position of an aircraft system. For example, controller 120 may identify a centered position of a stabilizer and elevator of aircraft 100 as the equilibrium position.

Task 712 identifies a current position of the aircraft system. For example, controller 120 may determine how far away from the equilibrium position the stabilizer is currently located.

Task 714 generates a graphic illustrating an operating range of the aircraft system. For example, as will be discussed below, controller 120 may generate graphics of FIG. 8 in task 714.

Task 716 generates an indicator in the graphic based on a difference and a rate of change of the difference between the equilibrium position and the current position of the aircraft system. For example, controller 120 may indicate the rate of change of the difference by changing the slope of a line. In some embodiments, the slope of the line may indicate whether the difference is trending up or trending down.

Figure 8:
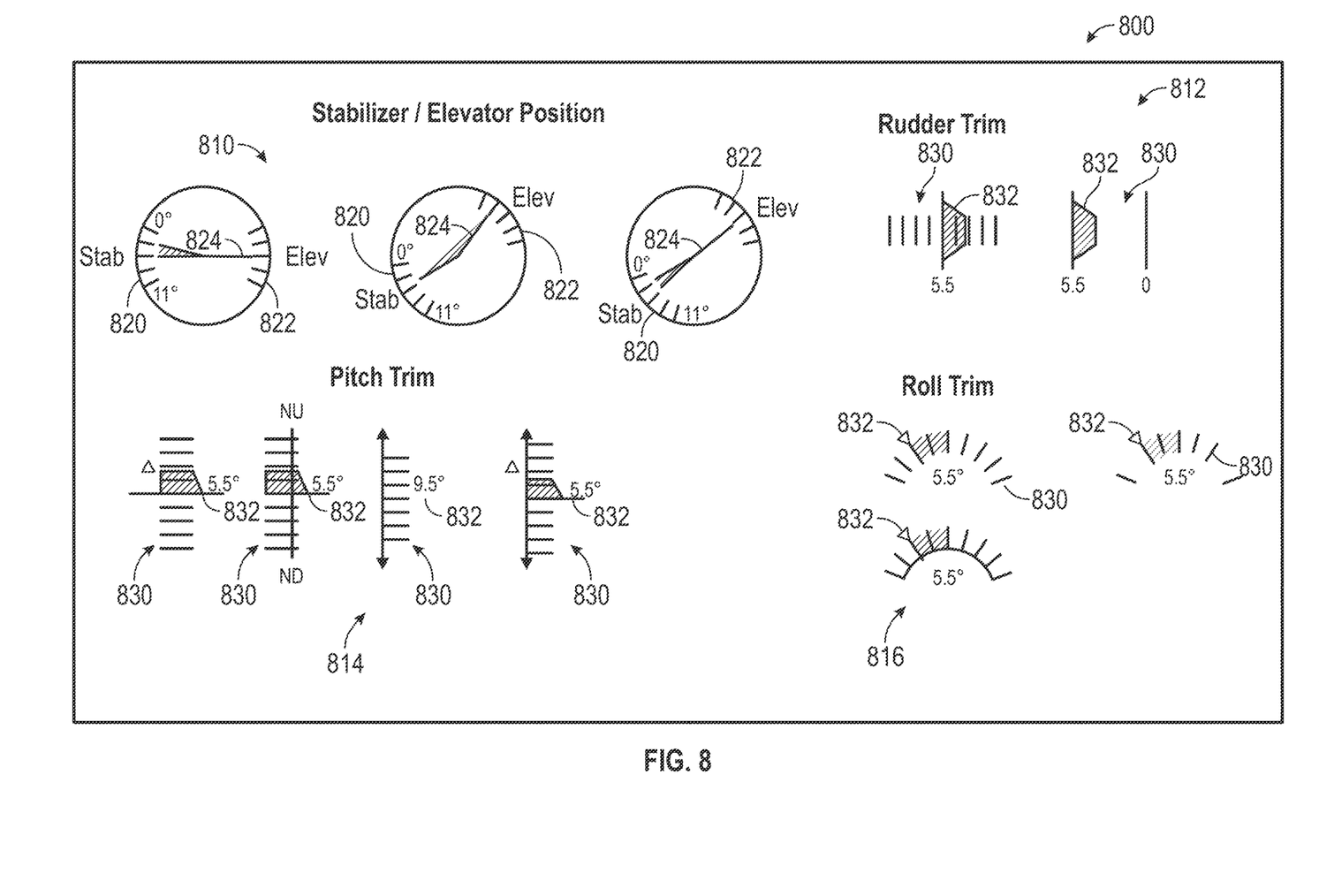

Referring now to FIG. 8, and with continued reference to FIG. 7, a graphic set 800 illustrates examples of graphics and indicators that may be generated by method 700 for various aircraft systems. Graphic set 800 includes various graphics that may be presented on a display within an aircraft as graphical user interfaces to indicate the difference and the rate of change of the difference between the equilibrium position and the current position of various systems of the aircraft.

Graphic set 800 includes a stabilizer/elevator system graphic type 810, a rudder trim graphic type 812, a pitch trim graphic type 814, and a roll trim graphic type 816. Stabilizer/elevator system graphic type 810 includes a stabilizer portion 820, an elevator portion 822, and an indicator 824 disposed between the stabilizer portion 820 and the elevator portion 822. When the stabilizer and elevator are at equilibrium, indicator 824 is a straight line. The angle at a center point of indicator 824 is based on the difference between the equilibrium condition and the current position of the stabilizer and the elevator.

Rudder trim graphic type 812 includes a graphic 830 and an indicator 832. A distance between a center point of the graphic and the indicator illustrates the difference between the equilibrium position and the current position of the rudder of the aircraft. Pitch trim graphic type 814 is similar to rudder trim graphic type 812, where like numbers refer to like components. Pitch trim graphic type 814, however, is vertically oriented. Roll trim graphic type 816 is similar to rudder trim graphic type 812, where like numbers refer to like components. Roll trim graphic type 816, however, includes a curved graphic 830.

What is claimed is:

1. An aircraft, comprising:
  a display;
  a support system including at least one operable component, wherein at least one of the support system and the at least one operable component is configured to operate with an operating value falling within a predefined normal operating range;
  an avionics system communicatively coupled with the display, the avionics system programmed to:
    present, on the display, a representation of the support system as a collapsed row that indicates characteristics or status of the support system;
    calculate a rate of change of a value of at least one of the support system and the at least one operable component;
    determine whether the value has a trend by which the value will exit a predetermined normal operating range within a predetermined time based on the rate of change of the value;
    indicate on the display that the value is expected to exit the predetermined normal operating range;
    automatically expand the collapsed row into an expanded row on the display when the value is out of the predetermined normal operating range or when the value is expected to exit the predetermined normal operating range, the expanded row including additional information relating to the value, the characteristics of the support system, or the status of the support system; and automatically collapse the expanded row on the display when all values in that row are within predetermined normal operating ranges.

2. The aircraft of claim 1, wherein the avionics system is further programmed to indicate the value on the display while the value is within the predefined normal operating range.

3. The aircraft of claim 2, wherein the avionics system is further programmed to indicate on the display that the value is expected to exit the predetermined normal operating range by changing an appearance of the value on the display when the value is expected to exit the predetermined normal operating range.

4. The aircraft of claim 1, wherein the avionics system is further programmed to declutter the representation of the support system by displaying additional information relating to the value in response to determining that the value is outside of a second operating range that is narrower than and encompassed by the normal operating range.

5. The aircraft of claim 1, wherein the avionics system is further programmed to present additional information about the at least one of the support system and the at least one operable component in response to determining that the value will exit the predetermined normal operating range.

6. The aircraft of claim 1, wherein the avionics system is programmed to indicate on the display that the value is expected to exit the predetermined normal operating range in response to at least one of the following conditions: the rate of change of the value indicating that the value will exit the predetermined normal operating range within a predetermined amount of time or the value being near a boundary of the normal operating range.

7. The aircraft of claim 1, wherein the support system is one of a mechanical system, a hydraulic system, a pneumatic system, and an electrical system.

8. An avionics system for an aircraft, the avionics system comprising:
 a display; and
 a controller programmed to:
  present, on the display, a representation of an aircraft system as a collapsed row that indicates characteristics or status of a component of the aircraft system;
  calculate at least one of a rate of change of a value of the component of the aircraft and variance from equilibrium;
  determine whether the value has a trend by which the value will exit a predetermined normal operating range within a predetermined time based on at least one of the rate of change of the value and the variance from equilibrium;
  indicate on the display that the value is expected to exit the predetermined normal operating range;
  indicate the rate of change of the value on the display;
  automatically expand the collapsed row into an expanded row on the display when the value is out of the predetermined normal operating range or when the value is expected to exit the predetermined normal operating range, the expanded row including additional information relating to the value, the characteristics of the component, or the status of the component; and
  automatically collapse the expanded row on the display when all values in that row are within predetermined normal operating ranges.

9. The avionics system of claim 8, wherein the controller is further configured to present a representation of an aircraft system that contains the component, and wherein the controller is further configured to indicate on the display that the value is expected to exit by changing a color of text and lines, shapes, and color fills of the representation of the aircraft system.

10. The avionics system of claim 8, wherein the controller is further configured to present additional information about the component in response to determining that the value is outside a second operating range that is narrower than the normal operating range.

11. An aircraft, comprising:
 an operable component, wherein the operable component is configured to operate with an operating value falling within a predefined normal operating range;
 an avionics system programmed to:
  present, on a display, a representation of the operable component as a collapsed row that indicates characteristics or status of the operable component;
  calculate a rate of change of a value of the operable component;
  determine whether the value has a trend by which the value will exit a predetermined normal operating range within a predetermined time based on the rate of change of the value;
  generate a graphic and an indicator to indicate on the display that the value is expected to exit the predetermined normal operating range;
  automatically expand the collapsed row into an expanded row on the display when the value is out of the predetermined normal operating range or when the value is expected to exit the predetermined normal operating range, the expanded row including additional information relating to the value, the characteristics of the operable component, or the status of the operable component; and
  automatically collapse the expanded row on the display when all values in that row are within predetermined normal operating ranges.

12. The aircraft of claim 11, wherein the avionics system is further programmed not to indicate the value on the display while the value is within the predefined normal operating range and a declutter feature is active.

13. The aircraft of claim 12, wherein the avionics system is further programmed to indicate on the display that the value is expected to exit the predetermined normal operating range by changing an appearance of the value on the display when the value is expected to exit the predetermined normal operating range.

14. The aircraft of claim 11, wherein the avionics system is programmed to indicate on the display that the value is expected to exit the predetermined normal operating range in response to at least one of the following conditions: the rate of change of the value indicating that the value will exit the predetermined normal operating range within a predetermined amount of time or the value being near a boundary of the predetermined normal operating range.

15. The aircraft of claim 1, wherein the avionics system is further programmed to generate a quick access selector in the expanded row on the display, the quick access selector enabling a component to counteract the trend.

16. The avionics system of claim 8, wherein the controller is further programmed to generate a quick access selector in the expanded row on the display, the quick access selector enabling a component to counteract the trend.

17. The aircraft of claim 11, wherein the avionics system is further programmed to generate a quick access selector in the expanded row on the display, the quick access selector enabling a component to counteract the trend.

18. The aircraft of claim 1, wherein the avionics system is further programmed to:
- generate, on the display, a system tab row comprising a plurality of selectable system tabs, each corresponding to one of a plurality of aircraft support systems;
- determining that a component of an aircraft support system is trending out of range, or within edge boundary of normal range, or outside of an equilibrium position; and
- in response to the determining, presenting an out-of-nominal trend indicator on at least one of the selectable system tabs to indicate that the component of the aircraft support system is trending out of range, or within edge boundary of normal range, or outside of the equilibrium position.

19. The avionics system of claim 8, wherein the controller is further programmed to:
- generate, on the display, a system tab row comprising a plurality of selectable system tabs, each corresponding to one of a plurality of aircraft systems;
- determining that a component of an aircraft system is trending out of range, or within edge boundary of normal range, or outside of an equilibrium position; and
- in response to the determining, presenting an out-of-nominal trend indicator on at least one of the selectable system tabs to indicate that the component of the aircraft system is trending out of range, or within edge boundary of normal range, or outside of the equilibrium position.

20. The aircraft of claim 11, wherein the avionics system is further programmed to:
- generate, on the display, a system tab row comprising a plurality of selectable system tabs, each corresponding to one of a plurality of aircraft systems;
- determining that a component of an aircraft system is trending out of range, or within edge boundary of normal range, or outside of an equilibrium position; and
- in response to the determining, presenting an out-of-nominal trend indicator on at least one of the selectable system tabs to indicate that the component of the aircraft system is trending out of range, or within edge boundary of normal range, or outside of the equilibrium position.

* * * * *